May 13, 1930. F. D. PFEFFER ET AL 1,758,200
WET MIXING METHOD AND APPARATUS
Filed March 19, 1926 2 Sheets-Sheet 1

INVENTORS
FREDERIC D. PFEFFER
FRED TROTTER
BY
ATTORNEY

May 13, 1930.  F. D. PFEFFER ET AL  1,758,200
WET MIXING METHOD AND APPARATUS
Filed March 19, 1926    2 Sheets-Sheet 2

INVENTORS
FREDERIC D. PFEFFER
FRED TROTTER
BY
ATTORNEY

Patented May 13, 1930

1,758,200

UNITED STATES PATENT OFFICE

FREDERIC D. PFEFFER AND FRED TROTTER, OF FORT DODGE, IOWA, ASSIGNORS TO UNITED STATES GYPSUM COMPANY, OF CHICAGO, ILLINOIS, A CORPORATION OF ILLINOIS

WET MIXING METHOD AND APPARATUS

Application filed March 19, 1926. Serial No. 95,829.

This invention relates to the continuous wet mixing of a finely divided or powdered material such as, calcined gypsum, wall plaster, stucco and cement by centrifugal force. Among the objects of the invention are: to provide means for continuously feeding a dry or powdered material at the center of a rotating member, to introduce a liquid also at the center of a rotating member and to cause an intimate mixture of the water and the other materials; to provide means for accurately proportioning or measuring the material fed to the mixer; to prevent the material to be mixed from clogging in the hopper and to assure a steady flow thereof; to prevent the mixed material from collecting along the outer edge of the mixer; to provide means for directing or diverting the mixed material through a discharge outlet; and in general to provide the improved apparatus for carrying out the present method of wet mixing.

Figures 1, 2:
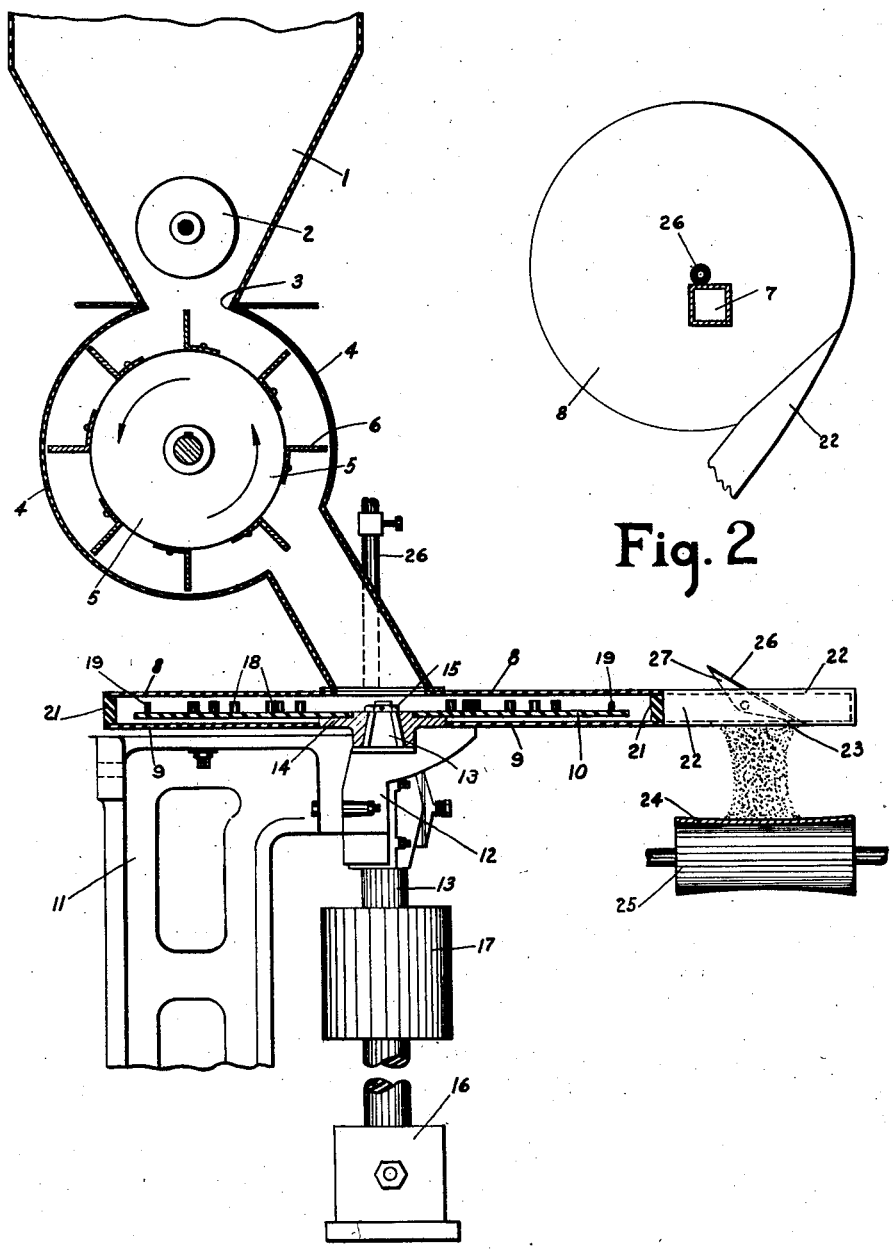
Figure 3:
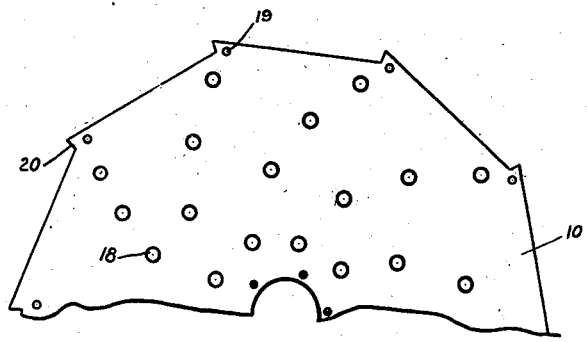
Figure 4:
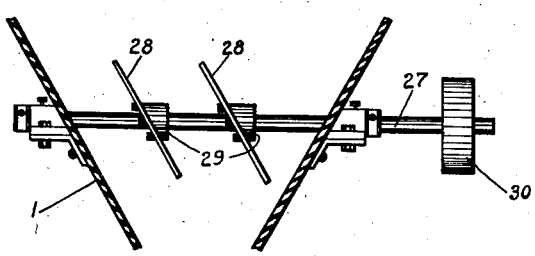
Figure 5:
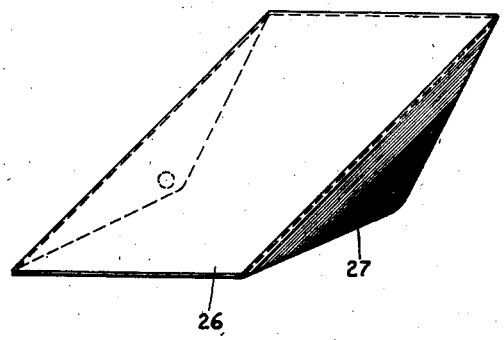

In the accompanying drawings, Fig. 1 is a side elevation partly in section of a wet mixing apparatus constructed in accordance with the principles of this invention; Fig. 2 is a sectional plan view of the top of the mixer proper; Fig. 3 shows about half of a mixing disc; Fig. 4 is a detail sectional view of the hopper feeding mechanism; and Fig. 5 is a perspective of a deflecting device.

This process of wet mixing comprises the continuous feeding of a dry material and a liquid, adjacent the center of a rotating disc or rotor upon which are a number of projections or pegs, perpendicular to the plane of the rotor. The pegs cause a cutting action, which coupled with the centrifugal force causes an intimate and continuous mixing of the dry material and the liquid. Enclosing and at the outer edge of the disc is a container and the mixed material is kept from collecting along the outer edge of the container by means of saw teeth in the edge of the disc, which carry the material to a discharge through which it may be introduced into the moulds to form a finished product or may be discharged upon a moving belt which carries the mixed material continuously to a plaster board machine or any other apparatus for using the mixed material continuously.

In carrying out this invention, a suitable bin or hopper 1 is supported at an elevation, in which a supply of the material to be mixed is contained. At the bottom of this bin is a rotating agitator 2, located in a reduced portion of the pin or hopper at the bottom of which is an opening 3 into a feeder comprising a cylindrical shell 4, a drum 5 mounted to rotate therein, and a plurality of projections comprising angle irons 6 secured at intervals to the drum 5, and extending substantially across the space between the drum and the cylinder 4, so that as the feeder rotates the dry material from the hopper 1 is carried from the opening 3 to a discharge spout 7, the feeder accurately measuring the material, which is discharged from the hopper, depending upon the number of rotations of the feeder drum in any given time.

At the lower end of the discharge spout 7 is a centrifugal mixer, which comprises upper and lower plates 8 and 9 and an intermediate rotating member or disc 10. This mixer is mounted upon a suitable base or support 11 to which is attached one or more bearings 12 for supporting a shaft 13 in upright position. At the upper end of the shaft, a hub 14 is secured in place by fastening means 15 and the disc 10 is suitably supported on the hub. At the lower end of the shaft 13 is a step bearing 16 and intermediate the ends of the shaft is a pulley 17 for operating the shaft.

Extending upwardly from the face of the disc 10 are a number of projections or pins, 18 and 19 arranged in radiating or spiral lines extending from the axis or center of the disc to the outer periphery thereof. The edge of this disc is formed with teeth 20, and although located some distance from an outer wall 21 which spaces apart the plates 8 and 9, the teeth cause the mixed material to be carried about the inside of the mixer container until they come to a discharge spout 22 disposing at one edge thereof. In the bottom of this spout 22 is an opening 23 through which the mixed material from the mixer may be discharged upon a belt or conveyor 24, mounted upon or carried by a roller or pulley 25 for conveying the mixed material away in a continuous stream.

In the discharge spout 22 is a deflector plate 26 with downwardly extending ears 27 by means of which the deflector is pivoted in the spout so that it will extend across the spout as shown in Figure 1 deflecting the discharged material through the opening 23, or it may be rotated so that it is flush with the top of the spout or opened to remove the lumps which may collect on the extending portion of the spout.

As shown more clearly in Fig. 2 the discharge spout 7 of the feeder is connected through top plate 8 of the mixer at or near the center thereof, and a liquid discharge pipe 26 is also connected through the upper plate 8 adjacent the center thereof. It is obvious that by placing the projecting pins 18 and 19 of the disc 10 at specified distances from the center thereof, a corresponding row of pins or projections may be attached to the under side of the plate 8 operating intermediate the rows of pins on the disc itself. These projections operate to cut or break up the material and to mix it more thoroughly with the liquid as it passes from the center to the periphery of the mixing disc. It is found advisable to have the smaller pins 19 at the outer edge thereof to cause finer breakage and mixture.

The feeder at the bottom of the bin 1 preferably comprises a shaft 27ª, which extends transversely at the bottom of the bin and upon which are mounted inclined plates 28 secured to the shaft by collars 29. At the outer end of the shaft is a pulley 30, by means of which the agitators may be rotated.

When this apparatus is operated as a continuous mixer, it is necessary only to supply the material to be mixed in a sufficient quantity to the hopper or bin 1, to rotate the feeding device at the bottom of the bin, to rotate the feeder in the cylinder 4 and to discharge the material to be mixed at the central portion of the rotating disc 10. A supply of water or other liquid is also admitted at or near the center of the disc 10 through a valved pipe 26 and the rotation of the disc at high speed throws the dry and liquid materials outwardly thereon against the pins or projections 18 and 19 which thoroughly breaks up any masses or lumps in the material and thoroughly mixes it with the liquid. The rotation of the disc carries the liquid material at the periphery thereof around through and into the discharge chute 22 where it is discharged upon a continuous conveyor 24.

By varying the speed of the different parts of this apparatus a variety of different results can be obtained, which will make the apparatus and the method thereof applicable to the continuous mixing of a number of different products. The rotation of the feeder drum 5 accurately measures the material which is discharged from the bin 1; the speed of the disc 10 may be varied between any desired limits depending upon the character and amount of the material to be mixed. Likewise, the amount and character of the liquid to be admitted by the pipe 26 may be changed as desired. Instead of discharging upon a belt, it is obvious that the mixture may be discharged in any receptacle, such as those used in a continuous block making machine, or any other apparatus which uses the mixed products continuously.

We claim:

1. In a wet mixer, a source of dry material supply, a continuous feeder at the bottom thereof, a rotatable member with a horizontal rotating surface, means for separately admitting dry material and a liquid at the center of the rotating member, and means for discharging the mixed dry and wet material as a wet mixture at the periphery of the rotatable member.

2. In a wet mixer, a dry material hopper, means for feeding the dry material continuously from the bottom thereof, a horizontal rotating member, means for admitting dry material and wet material at the center of the rotatable member, means for discharging the mixed dry and wet material in the wet state from the periphery of the rotatable member, and a continuous conveyor leading from the discharge.

3. In a mixer of the class described, a rotatable horizontal disc, a housing enclosing the disc, having an admission inlet at the center of the disc for dry and liquid material and a tangential discharge spout at the periphery of the disc.

4. In a centrifugal mixer of the class described a rotatable disc having a plurality of projections on its flat horizontal surface, the projections being spaced at different distances from the center, and with the smaller projections at the outer edge of the disc, and means for introducing a dry and a liquid material adjacent the center of the disc to be mixed under the action of centrifugal force.

5. The combination with a horizontal centrifugal mixer, of a dry material hopper, a continuous measuring feeder for discharging material from the hopper to the center of the mixer, a valve controlled source of liquid supply also discharging to the center of the mixer, a means for continuously conveying away the mixed material from the periphery of the mixer.

6. In a centrifugal mixer of the class described, a rotatable horizontal disc having teeth at the edge, means for supplying a solid and a liquid adjacent the center of said disc, and a housing for containing the disc with a wall adjacent the tooth periphery thereof the teeth assuring discharge from the housing.

7. In a mixer of the class described, a housing, a horizontal disc rotatable in the housing, the disc having projections from its upper surfaces and teeth at the periphery thereof, and the housing having an inlet opening at the center of the disc for solid and liquid material to be mixed, and a peripheral opening for discharging the material when it is mixed, the said teeth conducting the mixed material in the housing to the discharge therefrom.

8. In a mixer of the class described, a rotatable horizontal disc with upper projections and a tooth edge, means for enclosing the outer edge of the disc, and forming a discharge therefrom, feeding means for admitting solid and liquid material to be mixed at the center of the disc, and means for continuously carrying away the mixed material from the periphery of the disc.

9. In a mixer of the class described, a rotatable horizontal disc having upper projections and teeth at the outer edge thereof, a housing to enclose the disc having a tangential discharge spout with an opening at the bottom, a dry material hopper, means for feeding a measured amount of dry material at the center of the disc, a valved means for admitting a liquid supply at the center of the disk, and a continuous conveyor for removing the mixed material from the discharge, the material to be mixed being broken up and intermingled by the projections on the disc, and being discharged from the housing by the teeth of the disc.

10. A method of continuously mixing dry and wet materials which comprises continuously feeding a measured quantity of the dry material from a source of supply to a center of rotation, continuously supplying a liquid to said center of rotation, mixing the dry and wet materials by rotary motion, and moving the mixed materials to a discharge point by centrifugal force.

FREDERIC D. PFEFFER.
FRED TROTTER.